(12) United States Patent
Draaijer et al.

(10) Patent No.: US 11,177,879 B2
(45) Date of Patent: Nov. 16, 2021

(54) SYSTEMS AND METHODS FOR FREE SPACE OPTICAL COMMUNICATION USING ACTIVE BEAM STEERING

(71) Applicant: SIGNIFY HOLDING B.V., Eindhoven (NL)

(72) Inventors: Maurice Herman Johan Draaijer, Ittervoort (NL); Jan Ekkel, Eindhoven (NL); Ruben Rajagopalan, Neuss (DE); Harry Broers, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/050,711

(22) PCT Filed: Apr. 18, 2019

(86) PCT No.: PCT/EP2019/060098
§ 371 (c)(1),
(2) Date: Oct. 26, 2020

(87) PCT Pub. No.: WO2019/206809
PCT Pub. Date: Oct. 31, 2019

(65) Prior Publication Data
US 2021/0075509 A1    Mar. 11, 2021

(30) Foreign Application Priority Data
Apr. 24, 2018 (EP) .................................... 18168870

(51) Int. Cl.
*H04B 10/112* (2013.01)
*G02B 27/14* (2006.01)
(Continued)

(52) U.S. Cl.
CPC ....... *H04B 10/1121* (2013.01); *G02B 27/144* (2013.01); *H04B 10/118* (2013.01);
(Continued)

(58) Field of Classification Search
CPC ............ H04L 310/1121; G02B 27/144; H04B 10/1129; H04B 10/118; H04B 10/11
(Continued)

(56) References Cited

U.S. PATENT DOCUMENTS 6,381,055 B1 * 4/2002 Javitt ................. H04B 10/1123
398/131
6,804,422 B1 * 10/2004 Bajorins .................. G02B 6/32
359/407
(Continued)

FOREIGN PATENT DOCUMENTS

| EP | 1454433 B1 | 1/2007 |
| JP | 9049760 A | 2/1997 |

OTHER PUBLICATIONS

Qingkun Zhou, et al., "Design of Fast Steering Mirror Systems for Precision Laser Beams Steering," IEEE International Workshop On Robotic and Sensor Environments, Oct. 2008 (6 pages).

*Primary Examiner* — Abbas H Alagheband

(57) ABSTRACT

A system and method for performing free space optical communication with a plurality of streetlamp assemblies. The method includes transmitting a light beam from a first free space optical (FSO) unit of a first streetlamp assembly to a second FSO unit of a second streetlamp assembly along a transmission path. A transmission error is detected while transmitting the light beam along the transmission path. A location of one or more smart minors is obtained. An alternate transmission path is determined from the first FSO unit to the second FSO unit or a third FSO unit. The alternate transmission path includes a reflection of the light beam from the one or more smart minors. The first FSO unit is (Continued)

oriented with respect to the alternate transmission path. The light beam is transmitted from the first FSO unit along the alternate transmission path.

13 Claims, 7 Drawing Sheets

(51) Int. Cl.
*H04B 10/118* (2013.01)
*H04B 10/516* (2013.01)
*G02B 26/08* (2006.01)

(52) U.S. Cl.
CPC ...... *H04B 10/1129* (2013.01); *G02B 26/0833* (2013.01); *H04B 10/516* (2013.01)

(58) Field of Classification Search
USPC ......................................................... 398/121
See application file for complete search history.

(56) References Cited

U.S. PATENT DOCUMENTS

| | | | | |
|---|---|---|---|---|
| 7,343,099 B2* | 3/2008 | Wirth | ...................... | G02B 26/06 398/123 |
| 7,343,164 B2* | 3/2008 | Kallstenius | ......... | H04B 10/1125 370/329 |
| 7,603,041 B2* | 10/2009 | Varshneya | .......... | H04B 10/1123 398/170 |
| 8,155,527 B2* | 4/2012 | Rotgaizer | .......... | H04B 10/1123 398/122 |
| 2002/0075553 A1 | 6/2002 | Orcutt | | |
| 2002/0181055 A1* | 12/2002 | Christiansen | ...... | H04B 10/1123 398/156 |
| 2006/0024061 A1* | 2/2006 | Wirth | ................. | H04B 10/1125 398/129 |
| 2006/0056855 A1* | 3/2006 | Nakagawa | ........... | H05B 47/195 398/183 |
| 2008/0056723 A1* | 3/2008 | Giles | .................... | H04B 10/118 398/118 |
| 2013/0071107 A1* | 3/2013 | Kwon | .................. | H04B 10/516 398/25 |
| 2013/0315604 A1* | 11/2013 | LoPresti | ............... | H04B 10/271 398/116 |
| 2014/0161466 A1* | 6/2014 | Riza | ................... | H04B 10/1143 398/119 |
| 2016/0041523 A1* | 2/2016 | Ashrafi | ................. | G03H 1/2645 359/9 |
| 2018/0041279 A1* | 2/2018 | Segura | ............. | H04B 10/25891 |

* cited by examiner

SYSTEMS AND METHODS FOR FREE SPACE OPTICAL COMMUNICATION USING ACTIVE BEAM STEERING

CROSS-REFERENCE TO PRIOR APPLICATIONS

This application is the U.S. National Phase application under 35 U.S.C. § 371 of International Application No. PCT/EP2019/060098, filed on Apr. 18, 2019, which claims the benefit of European Patent Application No. 18168870.6, filed on Apr. 24, 2018. These applications are hereby incorporated by reference herein.

FIELD OF THE INVENTION

The present disclosure is directed generally to free space optical communication systems and methods using active beam steering.

BACKGROUND

A variety of different technologies exist for establishing high data rate communications. Many of the current fastest and/or highest capacity transmission technologies require the installation of physical connections, such as fiber optic cables. Often, these physical connections are buried underground. However, the digging required to install fiber and other physical connections is expensive, and not always possible, feasible, or permitted in some areas (e.g., banned within the limits of a city). Free space optics (FSO) is a communication technology that utilizes light propagation through free space (open air) to wirelessly transit data, and thereby offers an alternative to achieve high data rate communication without the physical connections extending between network nodes.

However, while a physical connection is not needed, FSO communication relies on the physical space between each adjacent set of nodes in the FSO network being unobstructed so that the encoded light beam can be transmitted between the nodes. This provides a challenge as landscapes, cities, towns, etc. may change continuously over time. As a result, FSO links that are clear when installed and/or usually unobstructed may become temporarily or permanently obstructed.

Accordingly, there is a continued need in the art for high data rate communication systems and methods that do not require physical connections and are adaptable to changing conditions over time.

SUMMARY OF THE INVENTION

The present disclosure is directed to inventive systems and methods for free space optical (FSO) communication, particularly to automatically adjust for environmental changes. Environmental changes may include a weather event or an object blocking the transmitted light beam, such as by a tree growing into the way of the optical transmission path. Systems disclosed herein include a plurality of FSO units and one or more smart mirrors that assist in the determination of alternate transmission paths between the FSO units if a transmission error is detected in a transmission path, e.g., due to an obstruction along the transmission path blocking the data transmission. The smart mirror may include a semi-reflective surface arranged to permit a portion of incident light to transmit through the surface to an optical sensor assembly while reflecting the remaining portion of the incident light. The optical sensor assembly may determine a location that the incident light is hitting the reflective surface. The smart mirror may communicate this location to the FSO unit transmitting the light beam and/or the smart mirror may include actuators such that the orientation(s) of the FSO units and/or the smart mirror can be adjusted to more accurately direct the light beam to the intended target while avoiding obstructions.

Generally, in one aspect, a method for performing free space optical communication with a plurality of streetlamp assemblies is provided. The method includes transmitting a light beam from a first free space optical (FSO) unit of a first streetlamp assembly to a second FSO unit of a second streetlamp assembly along a transmission path; detecting a transmission error while transmitting the light beam along the transmission path; obtaining a location of one or more smart mirrors; determining an alternate transmission path from the first FSO unit to the second FSO unit or a third FSO unit, the alternate transmission path including a reflection of the light beam from the one or more smart mirrors; orienting the first FSO unit with respect to the alternate transmission path; and transmitting the light beam from the first FSO unit along the alternate transmission path.

In one embodiment, the transmission error relates to an obstruction (26) hindering transmission of the light beam or to a link budget quality for the light beam along the transmission path to be determined as below a pre-set threshold for the link budget quality.

In one embodiment, the obstruction includes a tree, a building, snow, rain, fog, smog, dust, or a combination including at least one of the foregoing. In one embodiment, the method further includes sensing an incident light location of the light beam on the smart mirror with an optical sensor assembly. In one embodiment, the sensing includes transmitting a transmitted portion of an incident portion of the light beam through a reflective surface of the smart mirror, and receiving the transmitted portion with the optical sensor assembly.

In one embodiment, the method further includes communicating the incident light location to the first FSO unit. In one embodiment, the method further includes recalculating the alternate transmission path and adjusting an orientation of the first FSO unit in accordance with the recalculated alternate transmission path. In one embodiment, the method further includes adjusting one or more operating parameters of the light beam with the first FSO unit.

In one embodiment, the method further includes reorienting the smart mirror to change a direction of a reflected portion of the light beam from the smart mirror. In one embodiment, the reorienting includes driving one or more actuators to move or rotate the smart mirror in one or more directions or reconfigure a reflective surface of the smart mirror. In one embodiment, the one or more smart mirrors comprises a plurality of the smart mirrors and the alternate transmission path includes reflections from each of the smart mirrors.

Generally, in another aspect, a streetlamp assembly is provided. The streetlamp assembly includes a support; a light fixture mounted to the support; a free space optical (FSO) unit mounted to the support, the FSO unit including an optical transmitter configured to generate a light beam; an actuator configured to set an orientation of the FSO unit with respect to the support; and a controller configured to: detect a transmission error in transmission of the light beam to another FSO unit along a transmission path; obtain a location of one or more smart mirrors; and determine an alternate transmission path that includes a reflection of the light beam from the one or more smart mirrors.

Generally, in one aspect, a free space optical communication system is provided that includes a plurality of streetlamp assemblies and the one or more smart mirrors. In one embodiment, the one or more smart mirrors includes an optical sensor array configured to detect an incident light location of the light beam on the smart mirror. In one embodiment, the one or more smart mirrors is configured to communicate the incident light location to one or more of the streetlamp assemblies, to reorient itself to change a direction of a reflected portion (L3) of the light beam off of the smart mirror, or a combination including at least one of the foregoing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of systems and methods of free space optical communication. More generally, Applicant has recognized and appreciated that it would be beneficial to provide a free space optics communication system that includes smart mirrors to reflect light beams around obstructions. A particular goal of utilization of certain embodiments of the present disclosure is to detect and automatically correct for transmission errors and/or maintaining link budget quality using active beam steering by determining an alternate transmission path with a free space optics communication system including a plurality of smart mirrors.

In view of the foregoing, various embodiments and implementations are directed to systems and methods for free space optical (FSO) communication, particularly to automatically adjust for environmental changes. Environmental changes may include a weather event or an object blocking the transmitted light beam, such as by a tree growing into the way of the optical transmission path. Systems disclosed herein include a plurality of FSO units and one or more smart mirrors that assist in the determination of alternate transmission paths between the FSO units if a transmission error is detected in a transmission path, e.g., due to an obstruction along the transmission path blocking the data transmission. The smart mirror may include a semi-reflective surface arranged to permit a portion of incident light to transmit through the surface to an optical sensor assembly while reflecting the remaining portion of the incident light. The optical sensor assembly may determine a location that the incident light is hitting the reflective surface. The smart mirror may communicate this location to the FSO unit transmitting the light beam and/or the smart mirror may include actuators such that the orientation(s) of the FSO units and/or the smart mirror can be adjusted to more accurately direct the light beam to the intended target while avoiding obstructions.

Figure 1:
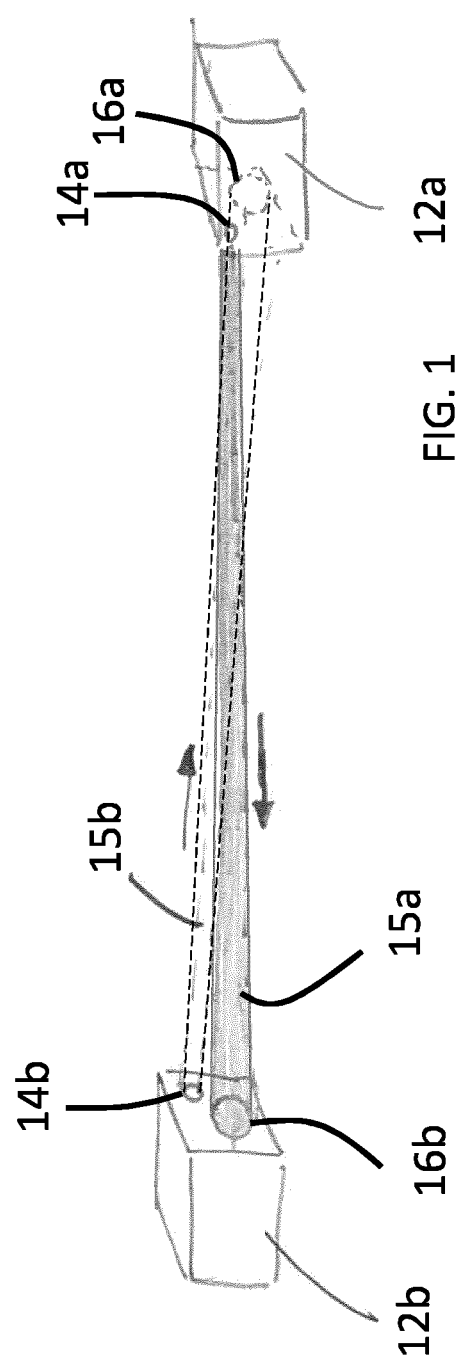
FIG. 1 illustrates a pair of free space optical communication units according to one embodiment disclosed here.

Referring to FIG. 1, in one embodiment, a free space optical (FSO) communication system is depicted having a plurality of FSO units 12. Alphabetic suffixes ('a', 'b', etc.) have been appended to individual ones of the FSO units to facilitate discuss with respect to particular ones of the FSO units 12. Similar naming conventions (alphabetic suffixes applied to base reference numerals) are utilized herein with respect to other components. It is to be appreciated that any discussion with respect to a component with a reference numeral that does not include an alphabetic suffix applies generally to all of the components sharing that base reference numeral, regardless of suffix (e.g., discussion of "the FSO units 12" applies to each of the FSO units 12a and 12b).

In the illustrated embodiment, each of the FSO units 12 includes an optical transmitter 14 configured to produce a beam 15 of light and a detector 16 configured to receive the beam 15. In FIG. 1, two separate beams 15a and 15b are produced respectively by the transmitters 14a and 14b, which enables bidirectional communication between the FSO units 12a and 12b. That is, the beam 15a from the unit 12a can be directed to, and received by, the detector 16b of the unit 12b, while the beam 15b from the unit 12b can be directed to, and received by, the detector 16a of the unit 12a. The optical transmitters 14 may include lasers.

Any technology or protocol for transmitting data in light beams may be utilized by the FSO units 12. For example, the light beam 15 may be encoded with information by modulating a carrier signal with a modulating signal that contains the information desired to be transmitted. The wavelength of the beams 15 can be set outside the visual spectrum if desired, which may enable the detectors 16 to more easily differentiate the beams 15 from ambient light, and therefore detect the beams 15. In one embodiment, the wavelength of the beams 15 is altered depending on the time of day to account for changing ambient conditions, e.g., due to the changing light spectrum from the sun or other light sources throughout the day. Furthermore, the beams 15 may be transmitted in a collimated or parallel manner, with little or no divergence, e.g., to facilitate accurate long range transmission. In one embodiment, each of the FSO units 12 may include multiple instances of the optical transmitter 14 for emitting a plurality of the beams 15.

Figure 2:
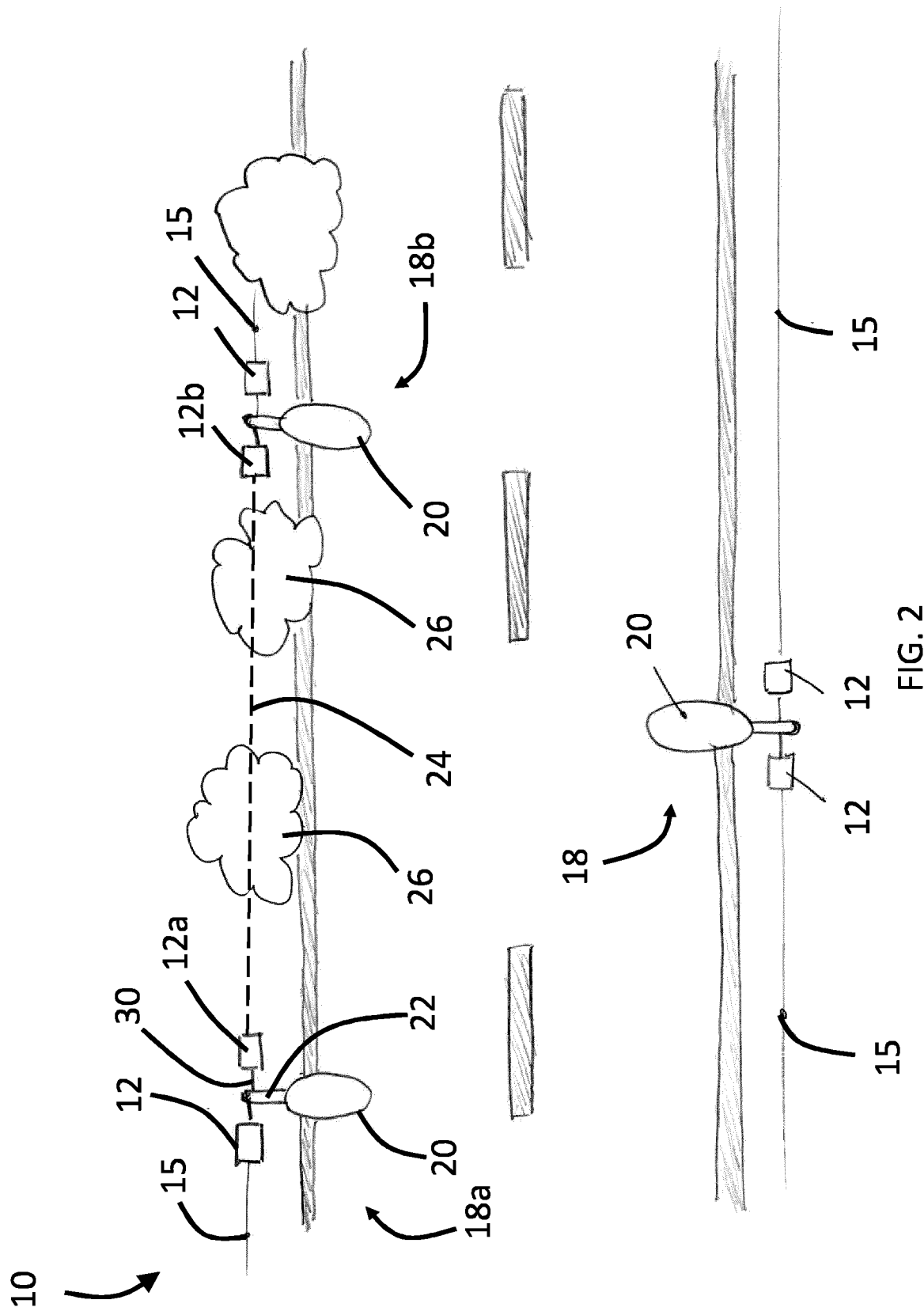
FIG. 2 is a top view of a free space optics communication system utilizing a plurality of streetlamp assemblies according to one embodiment disclosed herein.

A free space optical communication system 10 is schematically illustrated in FIG. 2 in which a plurality of streetlamp assemblies 18 is arranged (streetlamp assemblies 18a and 18b individually identified), including one or more of the FSO units 12 (i.e., the FSO units 12a and 12b, among others not provided with alphabetic suffixes). In the illustrated embodiment, each streetlamp assembly 18 includes a pair of the FSO units 12 oriented in generally opposite direction from each other, although it is to be appreciated that each streetlamp assembly 18 may include a single one of the FSO units 12 and/or more than two FSO units 12 oriented in any number of directions.

The term "streetlamp" or "streetlight" as used herein refers to any outdoor lighting infrastructure that includes a light fixture, such as a light fixture 20, extending from a support, such as a pole 22, in order to illuminate an area proximate to the streetlamp. The pole 22 may be built specifically for the streetlamp assembly 18, or may be used for some other purpose, e.g., a utility pole. It is to be appreciated that in other embodiments, one or more of the streetlamp assembly 18 may include or extend from other types of infrastructure, such as signage, buildings, bridges, or the like.

Advantageously, the streetlamp assemblies 18, which must already be electrically wired to power the light fixtures 20, can provide electrical hookups for the FSO units 12. Additionally, the FSO units 12 can be mounted to the streetlamp assemblies 18 at elevated positions to avoid the FSO units 12 being blocked or interfered with by people, vehicles, etc. Furthermore, streetlamps are commonly installed at regular intervals along a road, street, sidewalk, or other path, which extends to and/or between various locations where people reside, work, or otherwise desire high data rate communication. In this way, by installing the FSO units 12 at the streetlamp assemblies 18, the system 10 can be formed as a connected network of the FSO units 12, e.g., extending in any desired direction throughout all or part of a city, town, or other locations. Additionally, it is to be appreciated that existing streetlamp infrastructure can be leveraged for the streetlamp assemblies 18 by retrofitting the FSO units 12 on existing streetlamps. It is also to be appreciated that not every one of the FSO units 12 in the system 10 needs to be installed on a streetlamp. For example, certain ones of the FSO units 12 may be mounted on signage, buildings, or other infrastructure.

One issue faced by the free space optical system 10 can be appreciated in view of FIG. 2. In this example, a direct optical path 24 (e.g., the shortest path that the beam 15 would follow if sent directly from the FSO unit 12a to the FSO unit 12b) is blocked by one or more obstructions 26. The obstructions 26 may be anything that at least partially blocks or hinders the accurate transmission of information in light beams. For example, the obstruction 26 may include a physical object such as a tree, or be produced by, or as a result of, a weather or environmental occurrence, such as rain, snow, fog, smog, dust, or other air-borne particulate. Since FSO communication relies on an unobstructed optical path, the obstruction 26 prevents or frustrates data transmission between the FSO units 12a and 12b.

Figure 3:
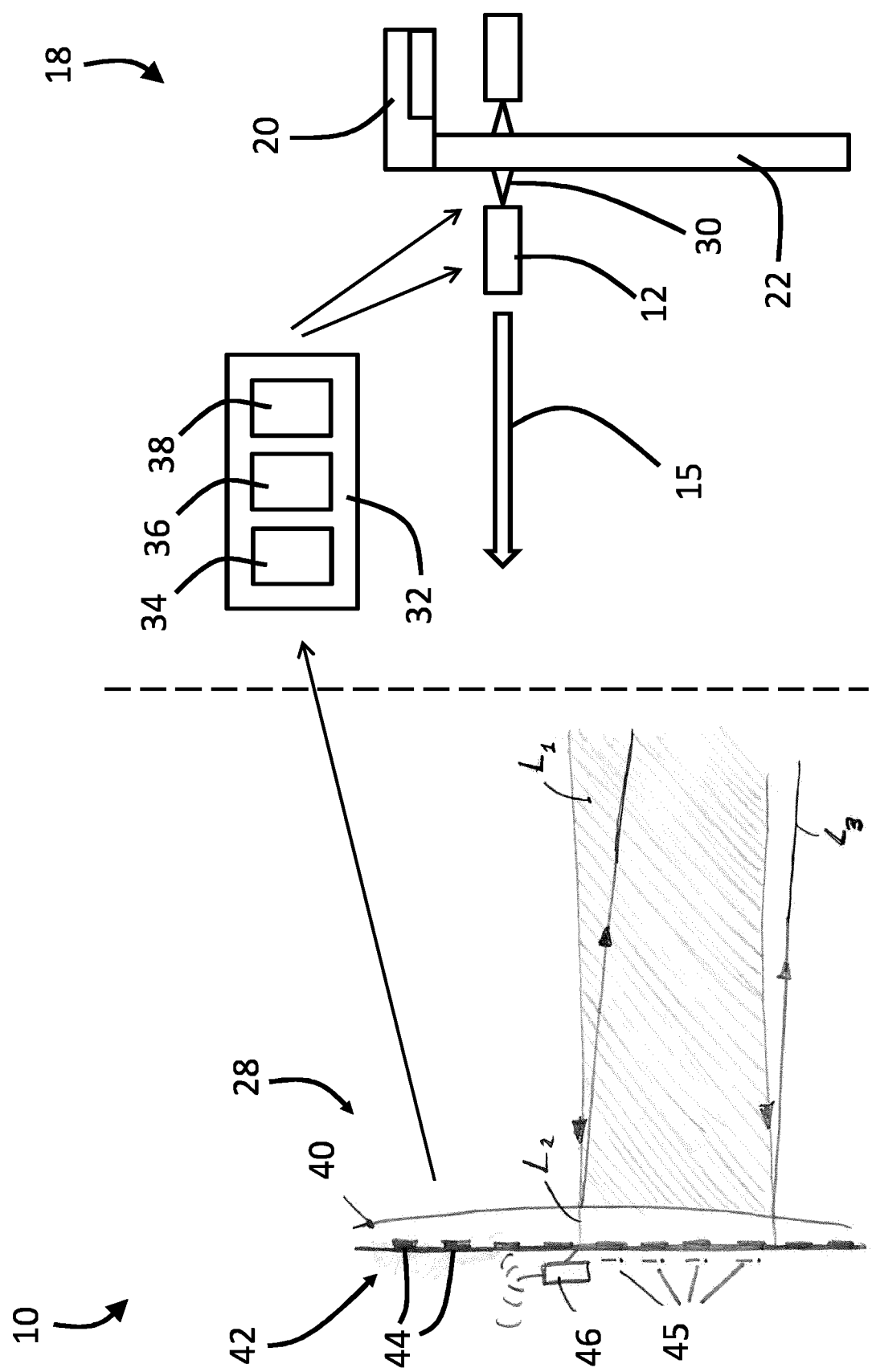
FIG. 3 is a top view of a free space optics communication system utilizing smart mirrors to reflect a light beam around an obstruction according to one embodiment disclosed herein.

Embodiments for the system 10 can be appreciated in view of FIG. 3, in which the system 10 includes a smart mirror 28 remote from the FSO units 12. The term "smart mirror" is intended to mean a device according to the embodiments disclosed herein that is configured (in addition to reflecting the light beams 15) to assist the system 10 in actively steering the beams 15 along alternate transmission paths in response to a detected transmission error, e.g., caused by one of the obstructions 26 blocking the transmission of the light beams 15. It is also noted that physical changes in the components of the system 10 may result in transmission errors. For example, vibrations or flexing of the streetlamps 18 (e.g., due to nearby construction activity, wind, or other stimulus), may result in a poor connection between any given pair of FSO units 12. Accordingly, the term "transmission error" as used herein refers to degradation in signal quality below some threshold amount, which may be a complete blockage of the transmitted communication or a reduction in signal quality that is deemed unacceptable. For example, a threshold may be set in some embodiments to maintain a sufficiently acceptable link budget quality, with any signal transmitted with a link budget quality below the pre-set threshold being deemed a "transmission error" for the purposes of the embodiments disclosed herein.

As discussed above, the light beam 15 is generated by one of the FSO units 12 (e.g., via the optical transmitter 14 as shown in FIG. 1), and directed toward a designated one of the smart mirrors 28, as shown in FIG. 3. The streetlamp assembly 18 may include an actuator 30 arranged to enable the FSO unit 12 to be aimed in different directions (e.g., enabling rotation, translation, etc. along or with respect to any desired axis), such that the light beam 15 can be directed at an intended target (e.g., one of the smart mirrors 28 or another of the FSO units 12).

The streetlamp assembly 18 may include or be in communication with a controller 32 arranged to facilitate operation of the components of the streetlamp assembly 18, notably the FSO unit 12 and/or the actuator 30. For example, the controller 32 may include a processor 34, a memory 36, and/or a communication module 38. The processor 34 may take any suitable form, such as a microcontroller, plural microcontrollers, circuitry, a single processor, or plural processors configured to execute software instructions. The memory 36 may take any suitable form or forms, including a volatile memory, such as random access memory (RAM), or non-volatile memory such as read only memory (ROM), flash memory, a hard disk drive (HDD), a solid state drive (SSD), or other data storage media. The memory 36 may be used by the processor 34 for the temporary storage of data during its operation. Data and software, such as the data transmitted via the beams 15 and/or the algorithms or software necessary to modulate signals to generate the beams 15, analyze the transmitted data, orient the FSO units 12 with the actuator 30, as well as an operating system, firmware, or other application, may be installed in the memory 36. The communication module 38 is arranged to enable communication between the components of the system 10. The communication module 28 may be any module, device, or means capable of enabling the transmission and/or reception of a wired or wireless communication signal, utilizing technologies that include, but are not limited to Wi-Fi (e.g., IEEE 802.11), Bluetooth, cellular, Ethernet, Zigbee, etc.

The controller 32 may be embedded into the FSO unit 12 or the light fixture 20 (e.g., to enable functionality of a smart or connected light system). In one embodiment, the system 10 and/or the streetlamp assembly 18 includes multiple controllers that provide at least some of the functionality disclosed herein, and which together form the controller 32 as described. Additionally, it is to be appreciated that some or all of the computing resources for the controller 32 may implemented by designated network infrastructure and/or cloud-based computing devices (e.g., a server, gateway, router, or other computing device in communication with the system 10 via the internet or other data network).

The smart mirror 28 includes a reflective surface 40. In one embodiment, the reflective surface 40 is semi-reflective, by which it is meant that the surface 40 is configured to reflect a portion of the beams 15 while permitting a portion of the beams 15 to be transmitted through the surface 40. For example, the surface 40 may be or include a dichroic mirror, a one-way mirror, a semi-transparent mirror, a beam-splitter, or any other optical element configured to reflect a portion of light from a surface while transmitting the remainder of the light through the surface. This is illustrated in FIG. 3 as an incoming or incident portion L1 of the beam 15 that hits the surface 40, and is split into a transmitted portion L2 and a reflected portion L3. The intensity of the reflected portion L3 may be a relatively large percentage of the intensity of the incident portion L1. For example, in one embodiment the reflected portion L3 is about 95% of the light intensity of the incident portion L1, although this intensity may be more or less in other embodiments. In one embodiment, the light intensity of the transmitted portion L2 and the reflected portion L3 is adjusted by a relationship between the wavelength of the light and properties of the surface 40. For example, the surface 40 may include a foil or other wavelength dependent material, i.e., a material that reflects/transmits different proportions of incident light depending on the wavelength of the light. As another example, the surface 40 may include a polarizing foil or other polarizing filter and the polarization of the incident light (e.g., set by the FSO unit 12) may be adjusted to alter the proportion of light reflected and transmitted.

The shape of the reflective surface 40 of the smart mirror 28 may be curved to facilitate aiming of the beams 15 (e.g., for directing the reflected portion L3 in a desired direction). For example, a convex curvature to the reflecting surfaces may yield an optically diverging effect on the beams 15. Optically diverging the beams 15 may be useful in some embodiments to increase the size of the beam as it travels, thereby increasing the chance of accurately locating the beams at the intended target. Without optical divergence, a narrow beam, such as created by a laser, may be only a few centimeters in diameter, and therefore more difficult to locate at or with the detector of the intended target FSO unit.

The transmitted portion L2 of the beam 15 is detected by an optical sensor assembly 42 located on the opposite side of the surface 40. For example, in one embodiment the beam 15 is generated having known and measurable characteristics, e.g., a known wavelength outside the visual spectrum and/or modulated with a carrier signal having a set base frequency, such that the sensor assembly 42 can easily detect the transmitted portion L2 of the beam 15. In this way, the impact of ambient light and/or light from other sources, can be minimized or eliminated. If required, additional optical filtering can be applied to sensor assembly 42 to attenuate ambient or other interfering light sources.

The sensor assembly 42 is configured to collect data that can be used to determine where on the surface 40 of the smart mirror 28 the incident portion L1 of the light beam 15 is arriving. For example, while the beam 15 may only be a few centimeters wide, the width, height, or other dimensions of the surface 40 may be an order of magnitude or more larger than that. Particularly if the surface 40 is curved, it can be useful to find the location of the incident portion L1 of the beam 15 because the beam 15 can be steered to its intended destination by moving the beam 15 across curved surface.

In the illustrated embodiment, the sensor assembly 42 includes a plurality of segments 44 arranged in an array. It is to be appreciated that the smart mirror 28 is illustrated cross-sectionally in FIG. 3, and that the segments 44 of the sensor assembly 42 may span the entire area behind on the semi-reflective surface 40. The segments 44 may be formed by individual sensor modules arranged in an array, or the sensor assembly 42 may be arranged with one or more sensors divided into segments or areas that enable location-identifiable sensing capabilities. In the example of FIG. 3, the transmitted portion L2 of the light beam 15 is illustrated as activating a plurality of the segments 44, designated as a subset 45, which can be utilized to determine the location that the incident portion L1 of the beam 15 hit the surface 40.

The smart mirror 28 may include a communication module 46, e.g., akin to the communication module 38, that is arranged to communicate the detected location back to the FSO unit 12 that transmitted the beam 15. Since the data representative of the location of the incident portion L1 only requires a limited transmission of data, a relatively shorter range and/or lower data rate communication technology may be used to communicate this information, e.g., Wi-Fi.

The streetlamp assemblies 18 may be configured to operate in response to receiving the detected location that the beam 15 is striking the surface 40. For example, operating parameters such as direction (e.g., with respect to x, y, and/or z coordinates), focus, intensity, wavelength, or modulation characteristics may be adjusted, e.g., by the controller 32. In one embodiment, the actuator 30 is driven to arrange the angle that the FSO unit 12 is oriented to adjust how the beam 15 is reflected off the smart mirror 28, thereby more accurately directing the beam 15 to its intended location. If the FSO unit 12 is operated to change the focus of the beam 15, e.g., to widen the beam 15, it may also proportionally increase optical power to maintain a sufficient signal to noise level.

Figure 4:
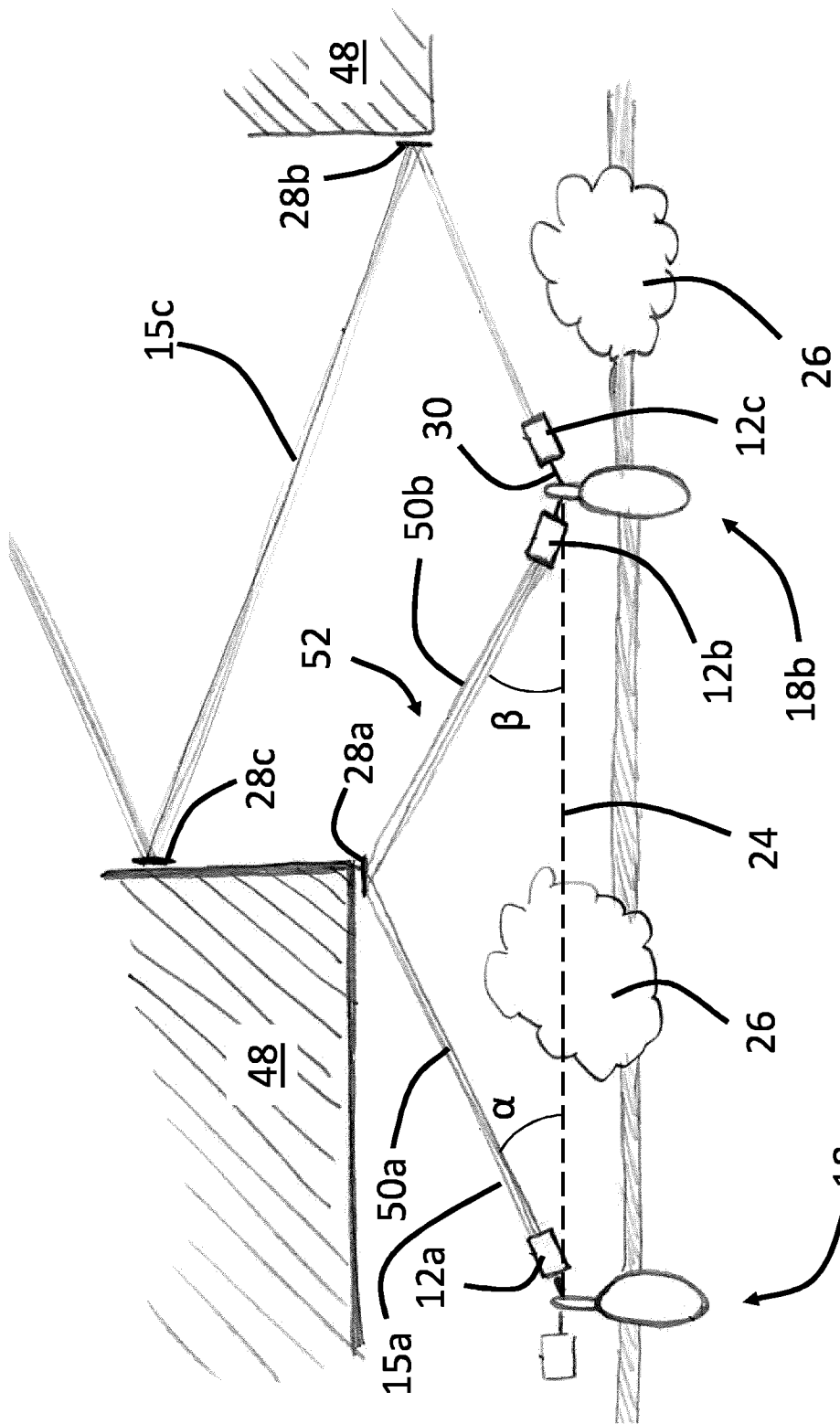
FIG. 4 is a top view of the free space optics communication system of FIG. 3 utilizing one of the smart mirrors to reflect a light beam in an alternate reflected path around the obstruction.

One embodiment for the system 10 is illustrated in FIG. 4, in which the system 10 includes a plurality of the smart mirrors 28 (i.e., the mirrors 28a, 28b, and 28c are shown). Each of the smart mirrors 28 may be attached to a fixed object 48, such as a building or other structure. As discussed herein, the smart mirrors 28 can be used to reflect the optical beams (e.g., the beam 15) in a path around objects or obstructions. For example, as shown in FIG. 4, the beam 15a produced by the FSO unit 12a follows a reflected optical path having a first segment 50a between the FSO unit 12a and the smart mirror 28a and a second segment 50b reflected from the smart mirror 28a to the FSO unit 12b. In this way, the segments 50a and 50b form an alternate transmission path 52 for the beam 15a that bypasses or avoids the obstruction 26 located between the FSO units 12a and 12b and enables high data rate communication between the units 12a and 12b. It is to be appreciated that the FSO unit 12b may utilize the alternate transmission path 52 in the reverse direction for sending communications to the FSO unit 12a.

As discussed above, an orientation of the FSO units 12 may be adjusted to direct the beams 15 at their intended targets. For example, the FSO unit 12a is oriented at an angle α with respect to the direct optical path 24 when transmitting the beam 15 along the alternate transmission path 52. Similarly, an angle θ with respect the direct optical path 24 can be determined for the FSO unit 12b to communicate along the alternate path 52. It is to be appreciated that FIG. 4 is a top view, and that angles to account for vertical differences may also be used by the FSO units 12.

In one embodiment, coordinates and/or relative positions of the obstructions 26, the mirrors 28, and the FSO units 12 are known by the system 10 (e.g., manually entered by a user, determined by global position system, etc.) and the system 10 is configured to determine and use only those optical transmission paths that are not blocked by the obstructions 26. The locations of the FSO units 12, the obstructions 26, and/or the smart mirrors 28 if known by the system 10 to enable the system 10 can be used to determine the proper orientations of the FSO units 12 (e.g., set by the actuators 30) for each of the transmissions paths (e.g., via the angles α and 13). For example, the smart mirrors 28 may be arranged to transmit their locations to the FSO units 12, e.g., via the communication module 46. In one embodiment, the locations of the FSO units 12, the obstructions 26, and/or the smart mirrors 28 are identified by the system 10 by a user manually entering information related to these positions into the system 10. For example, a user may enter information specifying that the optical path 24 cannot be used or may enter information specifying, describing, and/or defining the intended alternate transmission path.

In one embodiment, the FSO unit 12*a* is configured to first attempt to transmit the beam 15 directly to the FSO unit 12*b* via the optical path 24. In this embodiment, the FSO unit 12*b* may include its own optical transmitter for bi-directional communication as discussed above, and be configured to transmit a confirmation signal (e.g., similar to the beams 15*a* and 15*b* in FIG. 1) back to the FSO unit 12*a* upon receipt of the light beam 15. If a partial or incomplete transmission is received by the FSO unit 12*b* (e.g., the beam 15 is only partially blocked or degraded in quality) then errors can be detected by the system 10 utilizing checksums or other data integrity methods. The transmission errors, e.g., caused by the obstruction 26, wind, or other stimuli, can be detected by the FSO unit 12 (e.g., by the FSO unit 12*a* not receiving a confirmation signal from the FSO unit 12*b*, receiving an invalid checksum, or otherwise failing a data integrity check in some other manner). Upon detection of the error, the system 10 can determine an alternate transmission path utilizing one or more of the smart mirrors 28, such as the path 52 utilizing the smart mirror 28*a*, to bypass the obstruction.

In the above example using the smart mirror 28*a*, the beam 15*a* is only needed to bounce (reflect) once to reach its intended target (i.e., from the FSO unit 12*a* to the FSO unit 12*b*). However, it is to be appreciated that light beams in other situations may reflect off any number of mirrors in series between two of the FSO units 12. For example, the beam 15*c* from the FSO unit 12*c* is illustrated in FIG. 3 as reflecting off both of the smart mirrors 28*b* and 28*c*. The beams 15 may be reflected over relatively large distances, e.g., up to hundreds or thousands of meters. To facilitate long distance transmission, particularly over multiple reflections, the light of the beams 15 may collimated, or almost perfectly parallel (e.g., created by a laser as discussed above).

Figure 5:
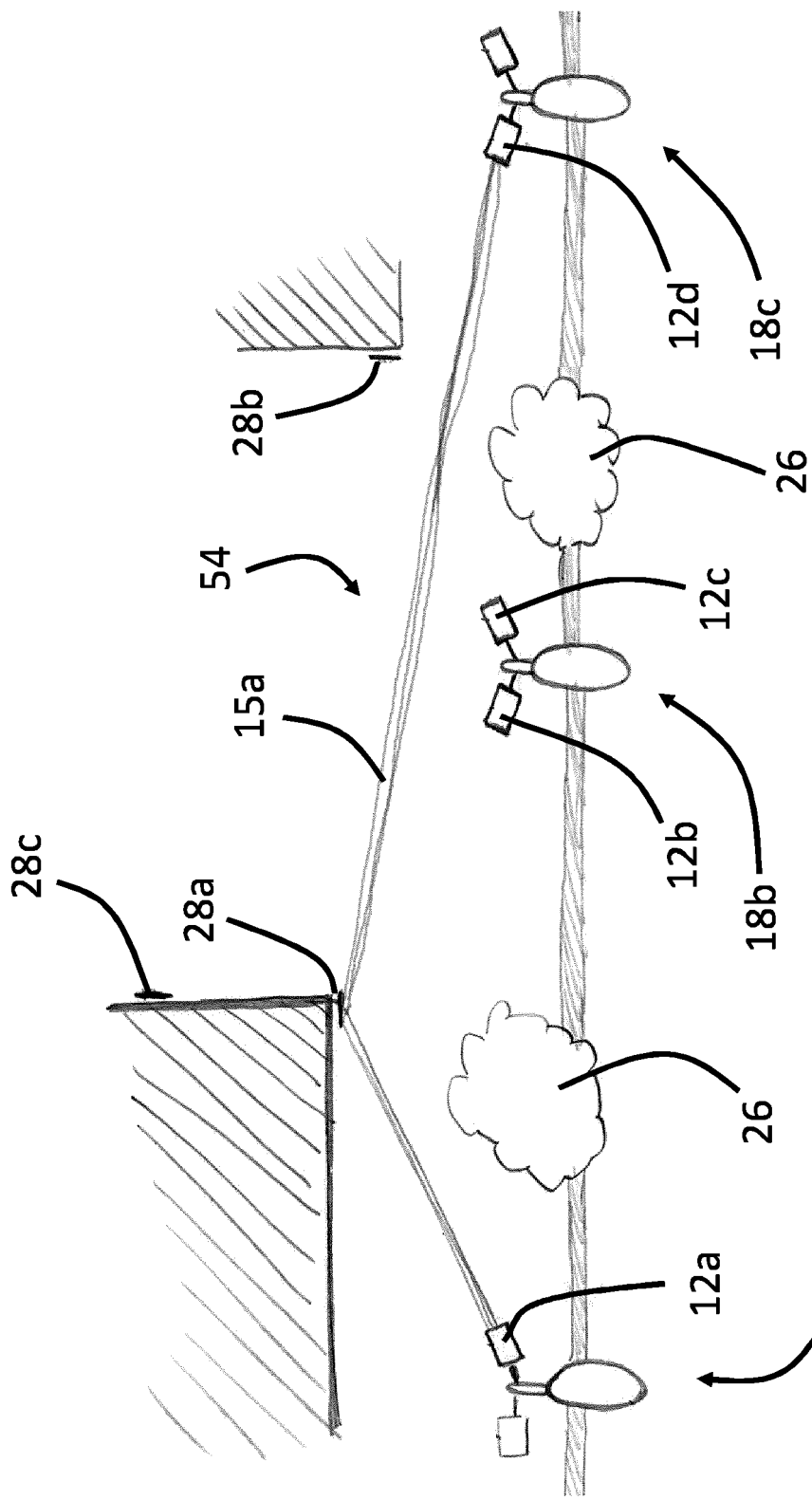
FIG. 5 schematically illustrates components of a free space optics communication system according to one embodiment disclosed herein.

Another embodiment for the system 10 can be appreciated in view of FIG. 5. In this embodiment, the FSO unit 12*a* uses the smart mirror 28*a* to reflect the light beam 15*a* to an FSO unit 12*d* of a streetlamp assembly 18*c* along an alternate transmission path 54. For example, the FSO unit 12*d* may be selected as the intended target for the beam 15*a* of the FSO unit 12*a* because the FSO unit 12*d* has possible transmission paths to FSO units and/or smart mirrors that the FSO unit 12*b* does not. As another example, transmission over a first alternate transmission path, e.g., the path 52 in FIG. 4, may be attempted, but transmission errors detected in that transmission. For example, this could be due to another obstruction, or due to movement of the streetlamp assembly 18 (e.g., wind causing vibrations or shifting in the position of the FSO unit 12*a*) that makes it difficult for the data transmission to accurate occur between the FSO units 12*a* and 12*b*. Instead of utilizing the same mirror (e.g., the smart mirror 28*a*) to reflect a light beam to a different FSO unit, it is to be appreciated that a different mirror could be used to create an alternate path to the same FSO unit (e.g., a mirror other than the smart mirror 28*a* used to direct the light beam to the FSO unit 12*b*) and/or to a different FSO unit (e.g., a mirror other than the smart mirror 28*a* to direct the light beam to the FSO unit 12*d*, such as using the smart mirror 28*b* to direct the light beam from the FSO unit 12*a* to the FSO unit 12*c*). In these examples, alternate transmission paths, such as the alternate path 52 in FIG. 4 and/or the alternate path 54 in FIG. 5, can be determined by the system 10 utilizing the known positions of the smart mirrors 28, the FSO unit 12, and/or the obstructions 26, and data transfer attempted over each of these alternate paths to determine which path yields the suitable results (e.g., accurate data transmission).

Figure 6:
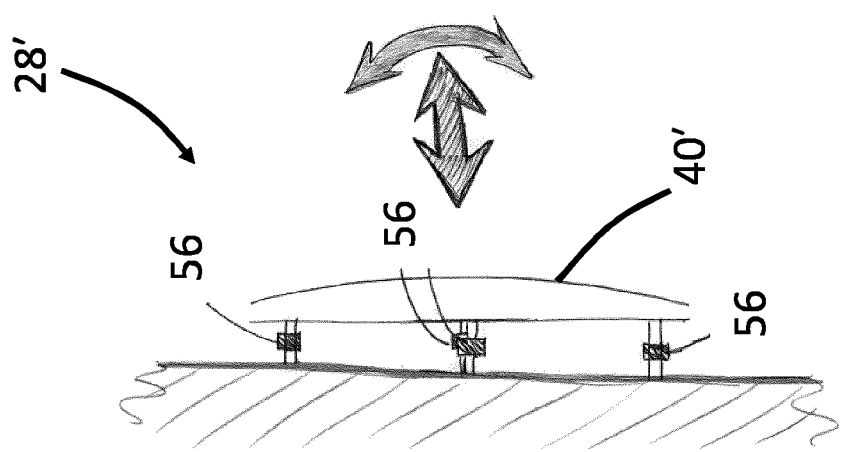
FIG. 6 is a side view of a smart mirror according to one embodiment disclosed herein.

It is to be appreciated that modifications can be made to and/or additional features added to the smart mirrors 28. For example, a smart mirror 28' according to one embodiment is illustrated in FIG. 6. The smart mirror 28' includes one or more actuators 56 that can be actively operated to change the orientation of the smart mirror 28' and/or a reflective surface 40' of the smart mirror 28'. For example, the actuators 56 may be linear actuators that can be separately changed in length to rotate the relative angle of the smart mirror 28' with respect to the incident portion L1 of the light beam 15 as discussed above, thereby enabling the smart mirror 28' to contribute in steering the reflected portion (e.g., the reflected portion L3 discussed with respect to FIG. 3) toward the intended target. In this embodiment, the beam can be steered by the smart mirror 28' even if it has a flat reflective surface. It is to be appreciated at any description made with respect to the smart mirror 28 and/or the surface 40 generally applies to the smart mirror 28' and/or the surface 40' unless otherwise indicated.

In one embodiment, the actuators 56 can be used to selectively make the reflective surface 40' of the smart mirror 28' flat or curved. For example, by applying durable and flexible materials underneath the reflective surface, manipulation of the actuators 56 can cause the surface of the mirror to change in curvature. In this way, the direction of the light can be set, as well as the degree of collimation, divergence, convergence, etc. As another example, the surface 40' of the mirror can be a mosaic of individual segments, each arranged with a discrete actuatable element (e.g., one of the actuators 56 arranged for each tile or mosaic segment). These small segments may be glued to a flexible material, embedded in a support structure (e.g., to form a substantially flat surface that is easier to clean), and/or slits provided between tiled areas to facilitate bending/reorientation.

In one embodiment, the smart mirror may be asymmetrically curved in such a way that rotating the smart mirror (e.g., via the actuators 56 arranged as rotational actuators) will cause the reflected beam to be pointed to a different location. Compared to a flat mirror, this may reduce the required number of degrees-of-freedom of the actuators 56 to set the desired orientation of the smart mirror.

In one embodiment, the smart mirror may communicate data from the sensor assembly 42 by modulating the movement and/or shape of the mirror, e.g., with the actuators 56, instead of and/or in addition to the communication module 46. For example, the actuators 56 may be configured to oscillate the mirror at a frequency that can be detected by the FSO units 12 and interpreted as instructions to change the orientation of the FSO unit 12. For example, the smart mirror may be configured to oscillate at a first frequency, e.g., 1 kHz, which indicates that the FSO unit 12 needs to shift the beam to its "left" or other direction, while oscillations at a second frequency, e.g., 2 kHz, could be used to indicated that the FSO unit 12 needs to shift its beam to the "right" or some other direction. In this way, the location of the incident portion L1 of the beam 15 can be communicated back to the FSO unit, such that the FSO unit can make minor adjustments to the transmission path. This may be particularly advantageous in embodiments in which the smart mirrors 28 do not include the communication module 46, e.g., as a lower cost option. It may also be useful to set up a connection for the first time between an FSO unit and a smart mirror to "pair" the mirror with the system 10. In one embodiment, the FSO units have time of flight (TOF) sensing capabilities and the actuators 56 are configured to be actuated simultaneously in phase in order to shorten/lengthen the TOF measurement. In this way, the changes in the TOF measurements can be used to communicate additional information from the smart mirror to the FSO units. Advantageously, conveying information using simultaneous actuator adjustment and TOF measurements adds a level of security as it is very difficult for a third party to sense or intercept this type of communication without dedicated equipment.

In one embodiment, the smart mirror may be weatherized and/or include environment coping features, such as heating elements for melting snow, vibration generators (e.g. by piezo elements) for shaking loose debris or precipitation, wipers for cleaning the reflective surface, etc. In one embodiment, the sensor assembly 42 may be arranged to harvest energy (e.g., since many optical sensors operate by generating current in response to sensed light). In this way, any excess energy not used by the smart mirror to adjust its orientation (e.g., to power the actuators 56) and/or to communicate with the FSO units 12 (e.g., to power the communication module 46) can be harvested and stored, e.g., in a battery, for later use or other purposes. In one embodiment, the output intensity of the transmitting FSO unit can be adjusted to provide a sufficient level of power to be harvested by the smart mirror to maintain operation. In one embodiment, the smart mirror may communicate a low energy status to the transmitting FSO unit (e.g., via any of the methods discussed herein) and the FSO unit may accordingly adjust its output power. Additionally, the property of the light can be adjusted to alter the proportion of the light reflected from and transmitted through the surface of the smart mirror (e.g., with a wavelength dependent foil or polarizing foil, as discussed herein), such that more or less power can be harvested from the incoming light beam (at the cost of a decrease in link budget quality).

Figure 7:
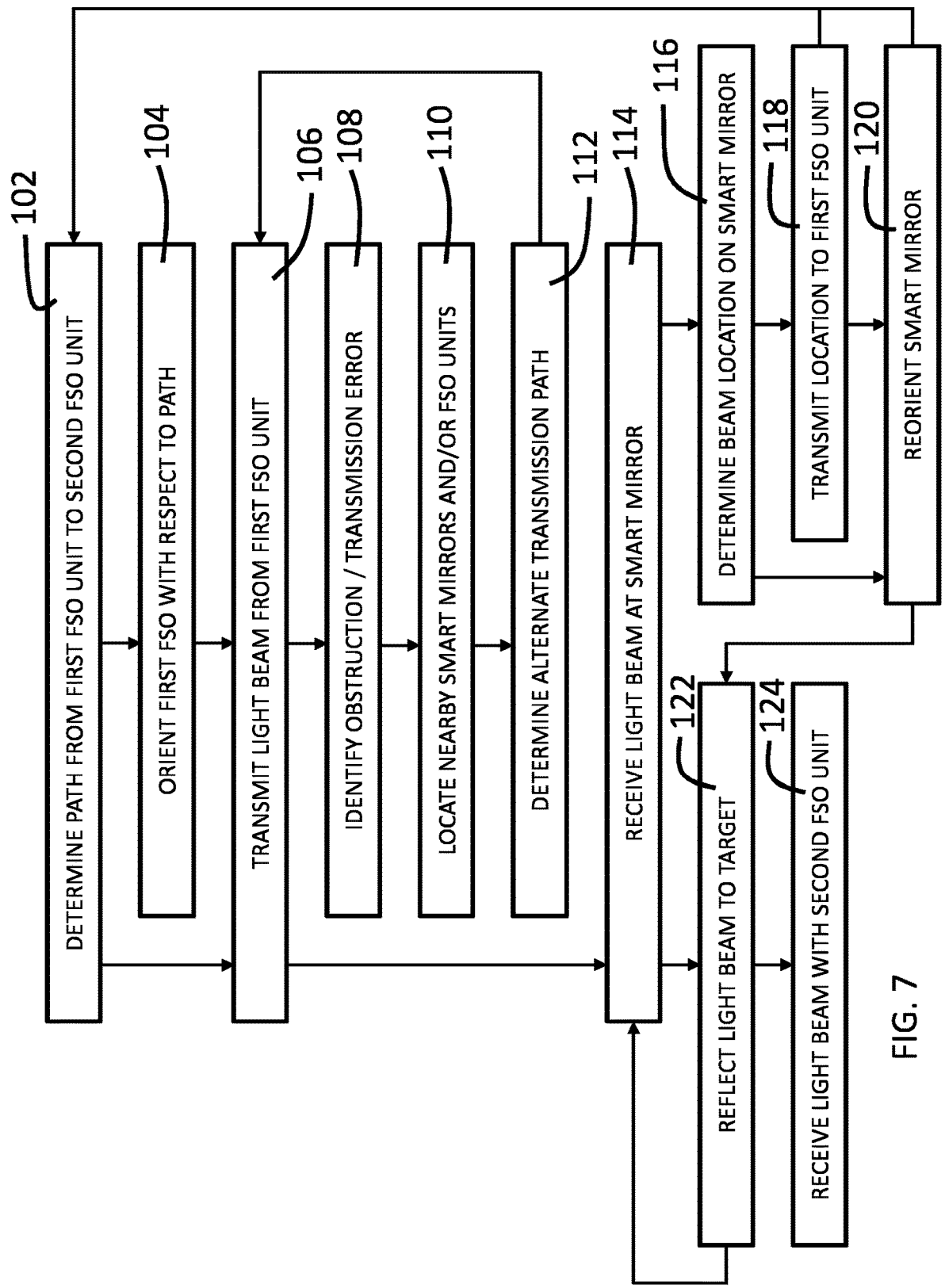
FIG. 7 is a flowchart illustrating a method of communicating with a free space optics system according to one embodiment disclosed herein.

A method 100 for operating a free space optical communication system is illustrated in FIG. 7. At step 102, a first path is determined between a first (sending) FSO unit and a second (receiving) FSO unit (e.g., by utilizing the known positions of the FSO units, obstructions, and/or smart mirrors as discussed above). At step 104, the first FSO unit is oriented with respect to the determined transmission path (e.g., the actuator 30 is utilized to set the angle α for the FSO unit 12a). After orienting the first FSO unit, or if the first FSO unit is already oriented, the first FSO unit transmits a light beam (e.g., the beam 15) at a step 106.

A transmission error, e.g., due to an obstruction in the optical transmission path (e.g., as discussed above with respect to the optical path 24), can be detected in step 108. If a transmission error is detected, then the location of other nearby smart mirrors and/or FSO units can be obtained in step 110 (e.g., stored in the memory 36). From the known locations of the other smart mirrors and/or FSO units, an alternate transmission path can be determined (e.g., by the controller 32) at step 112. Step 112 can return to step 106, at which the light beam is transmitted (now in accordance with the alternate transmission path determined in step 112). At step 114, the light beam is received at the smart mirror.

At step 116, the location of the incident portion of the light beam (e.g., the incident portion L1 of the light beam 15) is detected by the smart mirror. For example, the location may be determined by permitting a portion of the light beam to be transmitted through a semi-reflective surface (e.g., the surface 40) of the smart mirror, where this transmitted portion is detected by an optical sensor assembly (e.g., the sensor assembly 42). At step 118, the detected location is transmitted to the first FSO unit (e.g., via the communication module 46 and/or by manipulating the shape/orientation of the smart mirror with the actuators 56). At step 120, the shape, size, and/or orientation of the smart mirror is altered to assist in steering the beam to the target location (e.g., using the actuators 56).

The steps 118 and/or 120 may return the method 100 back to an earlier step, such as the step 102 (and/or step 106 or 112), in which the transmission path is recalculated based on the input transmitted from the smart mirror in the step 118. The second FSO unit (intended recipient) may change at this point if a newly determined path obviates the need to use the FSO unit that was originally selected as the "second FSO unit" according to step 102. Additionally or alternatively, step 120 may proceed to a step 122 at which the light beam is reflected by the smart mirror to the intended target. Step 114 may also proceed to step 122 if the beam is accurately aimed. If reflections off multiple smart mirrors are required, step 122 returns to step 114 for each mirror in the chain between the first FSO unit and the second FSO unit. Eventually, the light beam is received by the second FSO unit at step 124. The method 100 may then repeat with the second FSO unit of the previous iteration taking the place of the first FSO unit and another FSO unit selected to take the place of the second FSO unit.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method for performing free space optical communication with a plurality of streetlamp assemblies, comprising:
    transmitting a light beam from a first free space optical (FSO) unit of a first streetlamp assembly to a second FSO unit of a second streetlamp assembly along a transmission path;
    detecting a transmission error while transmitting the light beam along the transmission path;
    obtaining a location of one or more smart mirrors, wherein the smart mirrors include a semi-reflective surface arranged to permit a portion of incident light to transmit through the surface to an optical sensor assembly while reflecting the remaining portion of the incident light, and are configured to communicate a location of the incident light hitting its reflective surface, and include actuators such that an orientation of an FSO unit or the smart mirror may be adjusted;
    determining an alternate transmission path from the first FSO unit to the second FSO unit or a third FSO unit, the alternate transmission path including a reflection of the light beam from the one or more smart mirrors;
    orienting the first FSO unit with respect to the alternate transmission path; and
    transmitting the light beam from the first FSO unit along the alternate transmission path.

2. The method of claim 1, wherein the transmission error relates to an obstruction hindering transmission of the light beam or to a link budget quality for the light beam along the transmission path to be determined as below a pre-set threshold for the link budget quality.

3. The method of claim 2, wherein the obstruction includes a tree, a building, snow, rain, fog, smog, dust, or a combination including at least one of the foregoing.

4. The method of claim 1, further comprising sensing an incident light location of the light beam on the smart mirror with an optical sensor assembly.

5. The method of claim 4, wherein the sensing includes transmitting a transmitted portion of an incident portion of the light beam through a reflective surface of the smart mirror, and receiving the transmitted portion with the optical sensor assembly.

6. The method of claim 4, further comprising communicating the incident light location to the first FSO unit.

7. The method of claim 6, further comprising recalculating the alternate transmission path and adjusting an orientation of the first FSO unit in accordance with the recalculated alternate transmission path.

8. The method of claim 6, further comprising adjusting one or more operating parameters of the light beam with the first FSO unit.

9. The method of claim 4, further comprising reorienting the smart mirror to change a direction of a reflected portion of the light beam from the smart mirror.

10. The method of claim 9, wherein the reorienting includes driving one or more actuators to move or rotate the smart mirror in one or more directions or reconfigure a reflective surface of the smart mirror.

11. The method of claim 1, wherein the one or more smart mirrors comprises a plurality of the smart mirrors and the alternate transmission path includes reflections from each of the smart mirrors.

12. A streetlamp assembly comprising:
    a support;
    a light fixture mounted to the support;
    a free space optical (FSO) unit mounted to the support, the FSO unit including an optical transmitter configured to generate a light beam;
    an actuator configured to set an orientation of the FSO unit with respect to the support; and
    a controller configured to:
    detect a transmission error in transmission of the light beam to another FSO unit along a transmission path;
    obtain a location of one or more smart mirrors; and
    determine an alternate transmission path that includes a reflection of the light beam from the one or more smart mirrors,
    wherein the one or more smart mirrors includes an optical sensor array configured to detect an incident light location of the light beam on the smart mirror, is configured to communicate the incident light location to one or more of streetlamp assemblies, to reorient itself to change a direction of a reflected portion of the light beam off of the smart mirror, or a combination including at least one of the foregoing.

13. A free space optical communication system comprising a plurality of streetlamp assemblies according to claim 12 and the one or more smart mirrors.

* * * * *